(12) United States Patent
Mauduit et al.

(10) Patent No.: US 9,013,335 B2
(45) Date of Patent: Apr. 21, 2015

(54) DEVICE FOR CONTROLLING A BRAILLE DISPLAY, A BRAILLE DISPLAY, AND AN ASSOCIATED CONTROL METHOD

(75) Inventors: Damien Mauduit, Saint Michel sur Orge (FR); Didier Poitou, Dannemarie (FR)

(73) Assignee: Eurobraille, Paris (FR)

( * ) Notice: Subject to any disclaimer, the term of this patent is extended or adjusted under 35 U.S.C. 154(b) by 1120 days.

(21) Appl. No.: 13/016,694

(22) Filed: Jan. 28, 2011

(65) Prior Publication Data

US 2011/0181444 A1  Jul. 28, 2011

(30) Foreign Application Priority Data

Jan. 28, 2010  (FR) ..................................... 10 50604

(51) Int. Cl.
| H03K 17/94 | (2006.01) |
| H03M 11/00 | (2006.01) |
| G09B 21/00 | (2006.01) |
| G09B 21/02 | (2006.01) |

(52) U.S. Cl.
CPC ..................................... *G09B 21/02* (2013.01)

(58) Field of Classification Search
CPC .. G09B 21/003; G09B 21/001; G09B 21/007; G09B 21/004; G09B 21/00; G09B 21/02; G09B 21/025
USPC .......................... 341/21; 340/4.1, 4.12; 379/52
See application file for complete search history.

(56) References Cited

U.S. PATENT DOCUMENTS

| 5,355,149 | A | * | 10/1994 | Casebolt | 345/175 |
| 5,496,174 | A | * | 3/1996 | Garner | 434/114 |
| 5,685,721 | A | * | 11/1997 | Decker | 434/114 |
| 5,920,649 | A | * | 7/1999 | Yasuda et al. | 382/206 |
| 6,159,013 | A | * | 12/2000 | Parienti | 434/114 |
| 6,618,124 | B2 | * | 9/2003 | Paritsky et al. | 356/4.07 |
| 6,624,803 | B1 | * | 9/2003 | Vanderheiden et al. | 345/156 |
| 7,744,372 | B1 | * | 6/2010 | Minnich et al. | 434/113 |
| 7,786,425 | B2 | * | 8/2010 | Arnold | 250/221 |
| 2008/0068343 | A1 | | 3/2008 | Hoshino et al. | |
| 2008/0309913 | A1 | * | 12/2008 | Fallon | 356/4.01 |
| 2009/0220923 | A1 | * | 9/2009 | Smith et al. | 434/113 |
| 2011/0143321 | A1 | * | 6/2011 | Tran et al. | 434/114 |
| 2011/0161436 | A1 | * | 6/2011 | Moore | 709/206 |
| 2012/0156656 | A1 | * | 6/2012 | Caslick | 434/113 |
| 2012/0214139 | A1 | * | 8/2012 | Murphy et al. | 434/114 |

FOREIGN PATENT DOCUMENTS

| EP | 0874345 A1 | 10/1998 |
| WO | WO 98/26583 A1 | 6/1998 |

* cited by examiner

*Primary Examiner* — Jennifer Mehmood
*Assistant Examiner* — Emily C Terrell
(74) *Attorney, Agent, or Firm* — McKenna Long & Aldridge LLP

(57) ABSTRACT

The method relates to a method and a device for controlling a Braille display having a read area suitable for displaying a portion of a text in Braille form, said read area comprising a row of Braille cells. The control device comprises:
- emitters, each suitable for emitting a light beam in register with a respective Braille cell;
- receivers, each suitable for receiving a light beam reflected by at least one finger of a user when said finger is situated on a Braille cell; and
- a calculation unit suitable for determining the position or the succession positions of a user's finger relative to the read area as a function of the detected light beams, the calculation unit being suitable for triggering commands for navigation in the text as a function of the determined positions.

10 Claims, 3 Drawing Sheets

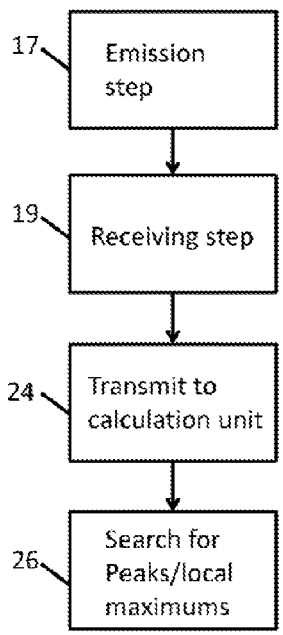
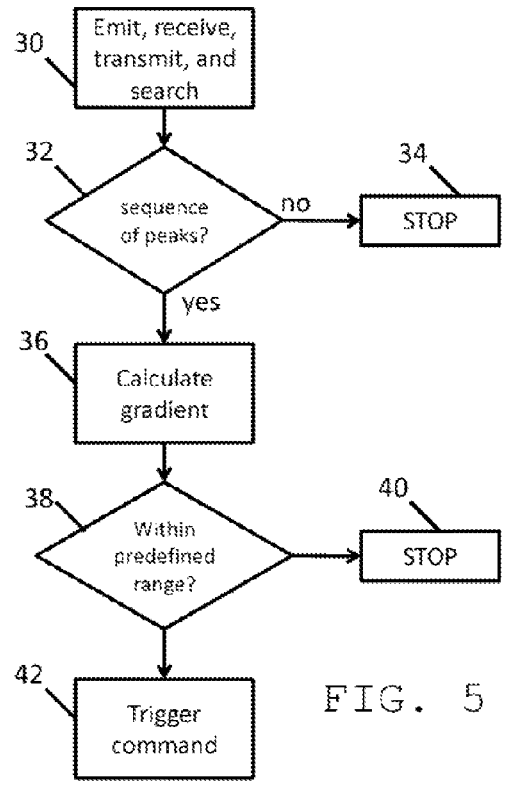
FIG. 3
FIG. 5

DEVICE FOR CONTROLLING A BRAILLE DISPLAY, A BRAILLE DISPLAY, AND AN ASSOCIATED CONTROL METHOD

This application claims priority to French Application No. 10 50604 filed on Jan. 28, 2010, which is hereby incorporated by reference in its entirety.

The invention relates to a device for controlling a Braille display, to a Braille display, and to a method of controlling the triggering of navigation commands on the display.

In particular, the invention relates to a device enabling a system that is fitted with a Braille read area to be controlled from the positions and the movements of the fingers over the Braille read area, i.e. the area that is for reading information in Braille form.

BACKGROUND OF THE INVENTION

Certain Braille displays have Braille cells disposed side by side to form a row, referred to as a read area, together with control buttons for triggering commands for navigating within a text, such as, return, move to the beginning or the end of a page, click, etc. The control buttons are spaced apart from one another so that the user can easily distinguish between them. Such Braille displays are bulky.

OBJECTS OF THE INVENTION

An object of the present invention is to provide a control device and method enabling the size of a Braille display to be reduced.

Furthermore, the fingers of a blind person using a prior art Braille display need to move from the read area to the control buttons. That results in a loss of time.

Another object of the invention is to propose a control device and method that enable reading and writing to be faster and more ergonomic.

The width of a Braille cell is about 5 millimeters (mm). A finger, even a very narrow finger, covers at least two Braille cells. A wider finger may cover three or four Braille cells. Furthermore, different users do not have fingers of the same size. A child or a woman will have fingers that are narrower than a man. Finally, some users are used to placing their fingers perpendicularly to the read area while other users are used to placing them transversely relative to the read area, i.e. at an angle of 45° relative thereto.

Another object of the invention is to propose a control device and method that are accurate regardless of the size of the user's fingers and regardless of the user's reading habits.

BRIEF SUMMARY OF THE INVENTION

In one of its aspects the invention provides a control device for controlling a Braille display, said Braille display having a read area suitable for displaying a portion of a text in Braille form, said read area comprising a row of Braille cells, wherein the control device comprises:
  emitters, each suitable for emitting a light beam in register with a respective Braille cell;
  receivers, each suitable for receiving a light beam reflected by at least one finger of a user when said finger is situated on a Braille cell; and
  a calculation unit suitable for determining the position or the succession positions of a user's finger relative to the read area as a function of the detected light beams, the calculation unit being suitable for triggering commands for navigation in the text as a function of the determined positions.

According to the present description, the receiver receiving the light beam reflected by a finger situated on a Braille cell is referred to as the receiver associated with said Braille cell.

According to one aspect of the invention, each receiver of the read area is suitable for transmitting an intensity value of the received light beam to the calculation unit; said intensity values constituting a sequence of intensity values. The calculation unit is suitable for searching for at least one peak amongst said intensity values, said peak being representative of the presence of a finger on a Braille cell for which the associated receiver has received the intensity value that forms the peak.

According to another aspect of the invention, each receiver of the read area is suitable for transmitting an intensity value of the received beam periodically, at a predefined frequency; said intensity values obtained on each period constituting sequences of intensity values following on from one another.

Preferably, the predefined frequency lies in the range 50 Hz to 150 Hz, and is preferably equal to 50 Hz.

According to one aspect of the invention, the calculation unit is suitable for searching for whether said peaks found in sequences that substantially follow on from one another are received by receivers that are neighbors; and in that the calculation unit is suitable for calculating the gradient of a straight line that passes closely via said peaks obtained for neighboring receivers and for verifying whether said gradient lies within a predefined range; when the gradient lies within said predefined range, the calculation unit is suitable for triggering a navigation command.

According to another aspect of the invention, it is suitable for detecting finger movements along the read area; said movements being orders for triggering navigation commands.

According to another aspect of the invention, the speed of said commands lies in the range 16 Braille cells per second to 200 Braille cells per second, and is preferably equal to 50 Braille cells per second.

According to another aspect of the invention, it is suitable for detecting presence-and-absence successions of at least one finger on at least one Braille cell, said successions being orders for triggering navigation commands.

According to another aspect of the invention, the duration of the absence of said finger on said Braille cell lies in the range 20 ms to 400 ms, and preferably lies in the range 40 ms to 200 ms, and in that the duration of the presence of said finger on said Braille cell lies in the range 20 ms to 600 ms, and preferably lies in the range 40 ms to 300 ms.

In another of its aspects the invention provides a Braille display having a read area suitable for displaying a portion of a text in Braille form, said read area comprising a row of Braille cells, and said display further comprising a control device as defined above.

In another of its aspects the invention provides a method of controlling a Braille display by means of a control device, said Braille display having a read area suitable for displaying a portion of a text in Braille form, said read area comprising a row of Braille cells; the control device comprising emitters, receivers, and a calculation unit; the method comprising the following steps:
  a) each emitter emitting a light beam in register with a respective Braille cell;
  b) each receiver receiving a light beam reflected by at least one finger of a user when said finger is situated on a Braille cell;

c) determining the position or the succession positions of the user's finger relative to the read area as a function of the detected light beams; and d) triggering navigation commands in the text as a function of the determined positions.

According to an aspect of the invention, the step of determining the position of the user's finger comprises the following steps:

e) each receiver of the read area transmitting to the calculation unit an intensity value for the light beam it receives; said intensity values constituting a sequence of intensity values; and f) searching for at least one peak amongst said intensity values of a sequence, said peak being representative of the presence of a finger on a Braille cell for which the associated receiver has received the intensity value forming the peak.

According to another aspect of the invention, the step of determining the successive positions of the user's finger comprises the following steps:

repeating steps a), b), e), and f);

searching for whether said peaks found in sequences that substantially follow on from one another are being received by receivers that are neighbors;

calculating the gradient of a straight line passing as close as possible through said peaks obtained for neighboring receivers; and verifying whether said gradient forms part of a predefined range, and when the gradient forms part of said predefined range, triggering a navigation command.

BRIEF DESCRIPTION OF THE DRAWINGS

The invention can be better understood on reading the following description given purely by way of example and with reference to the drawings, in which:

FIG. 3 is a diagram showing some of the steps of the control method of the invention;

FIG. 5 is a diagram showing some of the steps of the control method of the invention.

MORE DETAILED DESCRIPTION

Figure 1:
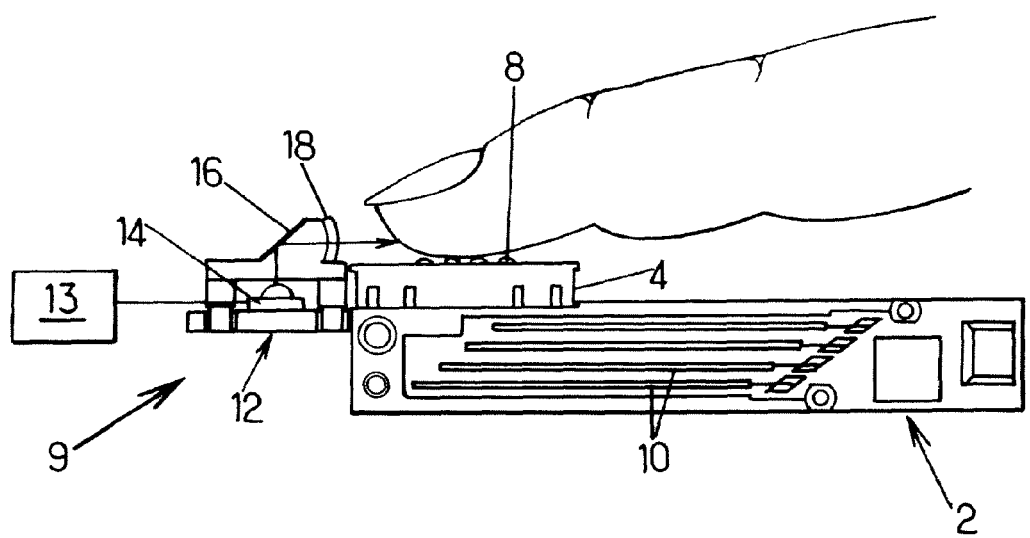
FIG. 1 is a diagrammatic section view of a Braille reader of the invention.
Figure 2:
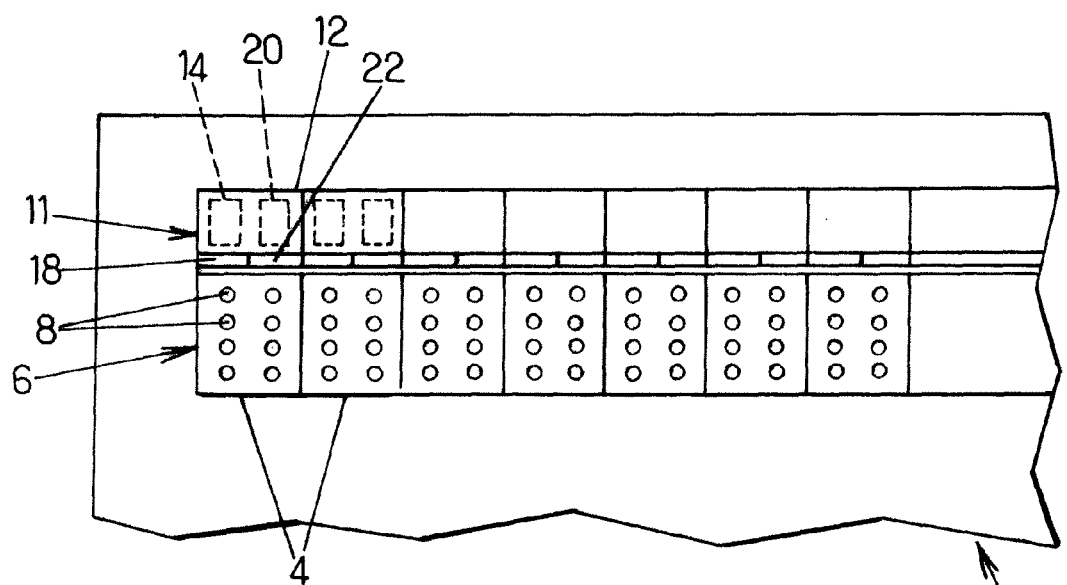
FIG. 2 is a diagrammatic view of a portion of the face of a Braille reader of the invention.

With reference to FIGS. 1 and 2, the Braille display 2 of the invention comprises Braille cells 4, e.g. thirty-two Braille cells, placed side by side to form a row referred to as a read area 6.

Each Braille cell 4 has eight vertically movable pins 8. The pins 8 are controlled independently of one another by piezoelectric bars 10 so as to occupy respective high or low positions. A combination of the positions of the eight pins 8 forms a character.

The Braille display 2 also has a control device 9 of the invention. The control device 9 comprises an optical bar 11 that extends parallel to the read area 6, and a calculation unit 13.

The optical bar 11 is constituted by a number of optical detector devices 12 that is equal to the number of Braille cells 4, i.e. in the example being described, thirty-two optical detector devices 12. Each optical detector device 12 is arranged adjacent to a Braille cell 4.

Each optical detector device 12 comprises an emitter 14, e.g. a light-emitting diode (LED), suitable for emitting a light beam, a reflecting surface 16 inclined at 45° relative to the vertical to reflect the light beam emitted by the emitter 14, and a first converging lens 18 suitable for focusing the light beam in register with the Braille cell 4. The first converging lens 18 serves to limit the finger detection distance.

By way of example, the light beam is an infrared beam.

Each optical device 12 further comprises a receiver 20 suitable for receiving the light beam reflected by a finger when a finger is positioned over the Braille cell adjacent to the optical device containing the receiver 20, and a second converging lens 22 suitable for focusing the reflected light beam onto the receiver 20.

By way of example, the receiver 20 is a phototransistor. It receives an intensity value of zero when there is no finger over the Braille cell 4.

In order to simplify understanding of the invention, the receiver 20 that is suitable for receiving the light beam reflected by a finger situated over a Braille cell 4 is referred to as the receiver 20 associated with that Braille cell 4.

The calculation unit 13 is connected to each emitter 14 to cause it to emit successive pulses at a frequency lying in the range 50 hertz (Hz) to 150 Hz, and preferably equal to 50 Hz.

The computer 13 is also connected to each receiver 20 to receive the intensity values of the light beams picked up by the receivers, and to process them in application of the control method described below in order to trigger navigation commands such as click, double click, return, cursor to top of page, or cursor to bottom of page.

According to the invention, the control method serves to determine the presence and the position of a finger regardless of its width.

With reference to FIG. 3, the method begins with an emission step 17 in which each emitter 14 emits a light beam in register with each Braille cell 4.

This step is followed by a step 19 in which each of the receivers 20 of the read area receives or does not receive a reflected light beam. Each receiver that is associated with a Braille cell 4 covered by a user's finger receives a light beam and sends a non-zero intensity value to the calculation unit 13.

Figure 4:
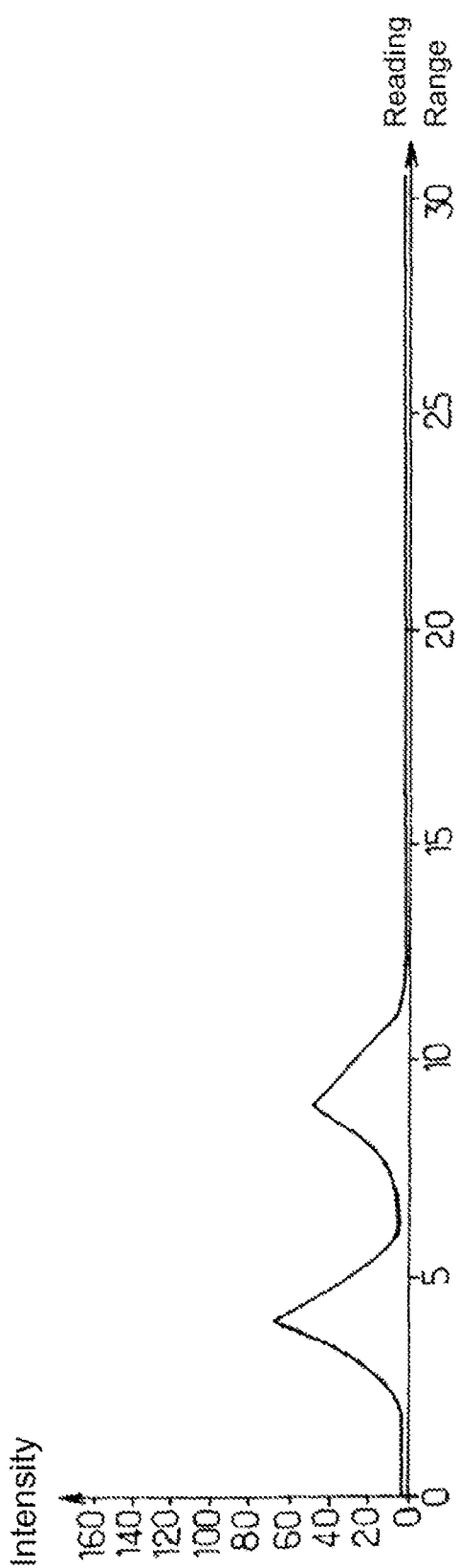
FIG. 4 is a graph plotting the intensity of the light beam received by the receivers of a read area.

FIG. 4 plots the intensity of the light beams detected by the thirty-two receivers 20 of the optical bar, when respective fingers are positioned on the fourth and the ninth Braille cells.

During a step 24, each receiver 20 of the read area 6 transmits to the calculation unit 13 an intensity value for the light beam received by said receiver 20 at a given instant; said intensity values constitute a sequence of intensity values.

During a step 26, the calculation unit 13 searches for the peaks or local maximums among said intensity values of a sequence by searching for places where a positive slope changes to a negative slope. By way of example, this search may be performed by differentiating the intensity values and by searching for the derivatives passing from a number that is greater than zero to a number that is less than zero.

A peak is representative of the presence of a finger on the Braille cell 4 associated with the receiver 20 that receives the intensity value constituting the peak.

These peaks are representative of the presence of a finger, and this applies regardless of finger size, and even when two fingers are next to each other.

For example, the table below represents an example of detecting two adjacent fingers positioned between the Braille cell numbered 4 and the Braille cell numbered 6. The value 1 indicates the presence of a peak. Only the first 13 cells are taken into consideration in the table. The absence of a value between the two peaks is representative of the space between the two fingers.

| | Braille cell number | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Intensity value | 0 | 0 | 2 | 8 | 4 | 10 | 6 | 2 | 0 | 0 | 0 | 0 | 0 |
| Derivative | 0 | 0 | 2 | 6 | −4 | 6 | −4 | −4 | −2 | 0 | 0 | 0 | 0 |
| Sequence | | | | 1 | | 1 | | | | | | | |

The method of the invention also makes it possible to trigger navigation commands by a user's movements over the read area, these movements being detected by the optical detector devices 12.

The movements for triggering navigation commands are selected so that they are not confused with the movements commonly used by blind people, such as moving two fingers over the read area 6 to clean dirty pins, or tapping fingers in front of the read area when irritated.

The optical bar 11 serves to detect precise voluntary movements of a user's fingers. In particular, movements involving moving fingers in front of the read area 6, i.e. along the horizontal axis, and movements involving lifting fingers from the read area 6, i.e. movements along a vertical axis.

For example, the click command may be performed by a presence-and-absence succession of a finger on the Braille cell. Under such circumstances, the finger is initially placed on the Braille cell 4 and then lifted off it, e.g. two or three times.

When such a sequence is performed, the calculation unit 13 is capable of determining an alternation of peaks, and of the zero value signal at a given Braille cell and at a given frequency.

The duration of the absence of said finger from said Braille cell lies in the range 20 milliseconds (ms) to 400 ms, and preferably lies in the range 40 ms to 200 ms; and the duration of the presence of said finger on said Braille cell lies in the range 20 ms to 600 ms, and preferably lies in the range 40 ms to 300 ms for the movement to be considered as an order for triggering a navigation command.

In a variant, another navigation command is implemented as a presence-and-absence succession for a plurality of fingers.

Another command may be implemented by the user passing a finger from the end of the read area to the beginning thereof at a speed lying within a determined range of speeds. For example, this passage may define the command for advancing the read area 6. Under such circumstances, the command for backing the read area is triggered by the user's finger moving quickly from left to right along the read area.

The travel speed of the finger may for example lie in the range 16 Braille cells 4 per second to 200 Braille cells 4 per second, and is preferably equal to 50 Braille cells 4 per second.

With reference to FIG. 5, such a movement is detected using a procedure comprising a step 30 of repeating above-described steps 17, 19, 24, and 26 at a predefined frequency.

Said predefined frequency lies in the range 50 Hz to 150 Hz, and is preferably equal to 50 Hz.

During a step 32, the calculation unit 13 searches whether said peaks that are found to be in sequences that substantially follow on one from another are being received by receivers that are neighbors.

In the present invention, the term "sequences that substantially follow on" means sequences that follow one another exactly or sequences that are separated by one or two intermediate sequences.

In the present invention, the term "receivers that are neighbors" means receivers that are directly adjacent to each other or receivers that are separated by one or two intermediate receivers.

For example, the table below shows an example of a succession of peaks representative of the movement of a finger over the Braille read area.

| | Braille cell number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1st sequence | | | | | | | | 1 | | | | |
| 2nd sequence | | | | | | | | 1 | | | | |
| 3rd sequence | | | | | | | 1 | | | | | |
| 4th sequence | | | | | | | 1 | | | | | |
| 5th sequence | | | | | | 1 | | | | | | |
| 6th sequence | | | | | | 1 | | | | | | |

If the calculation unit 13 finds no more peaks, then the method stops during a step 34.

Figure 6:
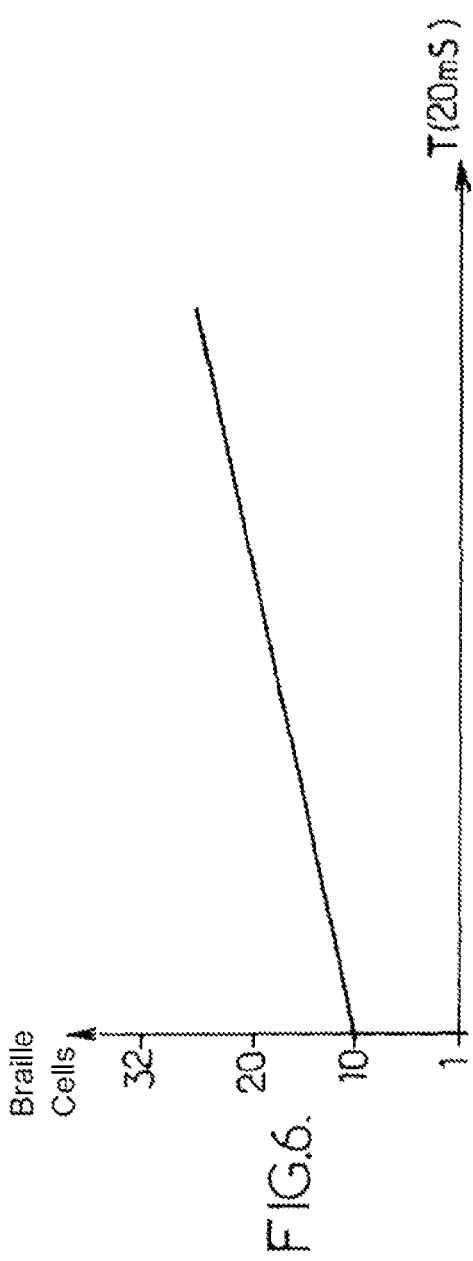
FIG. 6 is a graph showing a finger movement as it moves over a read area.

When a predefined number of peaks have been determined on neighboring Braille cells, the calculation unit 13 acts during a step 36 to calculate the gradient of a straight line as shown in FIG. 6, which line represents the presence of a peak on the Braille cells of the optical bar as a function of time. This gradient is calculated by a linear regression method, for example.

During a step 38, the calculation unit 13 determines whether the gradient lies within a predefined range of gradients that defines an intentional command from the user.

Said range of gradient values is ⅓ to 1.

If the gradient does not lie in the predefined range, then the method stops in a step 40.

If the gradient forms part of the predefined range, then the calculation unit 13 acts in a step 42 to trigger the command, such as the command to advance the read area 6, for example.

Advantageously, the method of the invention is capable of distinguishing between two touching fingers and one wide finger.

Advantageously, the device of the invention is easy to use.

Advantageously, the blind person feels immediately under the fingers when the requested commands have been performed.

What is claimed is:

1. A control device for controlling a Braille display, said Braille display having a read area suitable for displaying a portion of a text in Braille form, said read area comprising a row of Braille cells, wherein the control device comprises:
    emitters, each suitable for emitting a light beam in register with a respective Braille cell;
    receivers, each suitable for receiving a light beam reflected by at least one finger of a user when said finger is situated on a Braille cell; and
    a calculation unit suitable for determining the position or the succession positions of a user's finger relative to the read area as a function of the detected light beams, the calculation unit being suitable for triggering commands for navigation in the text as a function of the determined positions;
    wherein the receiver receiving the light beam reflected by a finger situated on a Braille cell is referred to as the receiver associated with said Braille cell, wherein each receiver of the read area is suitable for transmitting an intensity value of the received light beam to the calculation unit; said intensity values constituting a sequence of intensity values; and wherein the calculation unit is suitable for searching for at least one peak amongst said intensity values, said peak being representative of the presence of a finger on a Braille cell for which the associated receiver has received the intensity value that forms the peak;

wherein each receiver of the read area is suitable for transmitting an intensity value of the received beam periodically, at a predefined frequency; said intensity values obtained on each period constituting sequences of intensity values following on from one another; and wherein the calculation unit is suitable for searching for whether said peaks found in sequences that substantially follow on from one another are received by receivers that are neighbors; and wherein the calculation unit is suitable for calculating the gradient of a straight line that passes closely via said peaks obtained for neighboring receivers and for verifying whether said gradient lies within a predefined range; when the gradient lies within said predefined range, the calculation unit is suitable for triggering a navigation command.

2. The Braille display of claim 1, that is suitable for detecting finger movements along the read area; said movements being orders for triggering navigation commands.

3. The Braille display of claim 2, wherein the speed of said finger movements lies in the range 16 Braille cells per second to 200 Braille cells per second.

4. The Braille display of claim 1, that is suitable for detecting presence-and-absence successions of at least one finger on at least one Braille cell, said successions being orders for triggering navigation commands.

5. The Braille display of claim 4, wherein the duration of the absence of said finger on said Braille cell lies in the range 20 ms to 400 ms, and wherein the duration of the presence of said finger on said Braille cell lies in the range 20 ms to 600 ms.

6. The Braille display of claim 1, wherein the predefined frequency is equal to 50 Hz.

7. The Braille display of claim 2, wherein the speed of said finger movements is equal to 50 Braille cells per second.

8. The Braille display of claim 4, wherein the duration of the absence of said finger on said Braille cell lies in the range 40 ms to 200 ms, and wherein the duration of the presence of said finger on said Braille cell lies in the range 40 ms to 300 ms.

9. The Braille display of claim 1, wherein the predefined frequency lies in the range 50 Hz to 150 Hz.

10. A method of controlling a Braille display by means of a control device; said Braille device having a read area suitable for displaying a portion of a text in Braille form, said read area comprising a row of Braille cells; the control device comprising emitters, receivers, and a calculation unit; each Braille cell comprising pins movable vertically independently one from another; the method comprising the following steps:
   a) each emitter emitting a light beam in register with a respective Braille cell;
   b) each receiver receiving a light beam reflected by at least one finger of a user when said finger is situated on a Braille cell;
   c) determining the position or the succession positions of the user's finger relative to the read area as a function of the detected light beams; and
   d) triggering navigation commands in the text as a function of the determined positions;
   wherein the step of determining the position of the user's finger comprises the following steps:
   e) each receiver of the read area transmitting to the calculation unit an intensity value for the light beam it receives; said intensity values constituting a sequence of intensity values; and
   f) searching for at least one peak amongst said intensity values of a sequence, said peak being representative of the presence of a finger on a Braille cell for which the associated receiver has received the intensity value forming the peak; and
   wherein the step of determining the successive positions of the user's finger comprises the following steps:
   repeating steps a), b), e), and f);
   searching for whether said peaks found in sequences that substantially follow on from one another are being received by receivers that are neighbors;
   calculating the gradient of a straight line passing as close as possible through said peaks obtained for neighboring receivers; and
   verifying whether said gradient forms part of a predefined range, and when the gradient forms part of said predefined range, triggering a navigation command.

* * * * *